(12) United States Patent
Hagelin

(10) Patent No.: US 7,401,060 B2
(45) Date of Patent: Jul. 15, 2008

(54) DEVICE, USE, SYSTEM, AND STORAGE MEDIUM CONCERNING DECISION SUPPORT FOR, OR THE CONTROL OF, THE BEHAVIOR OF AN ENTITY

(75) Inventor: Hans-Ove Hagelin, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/805,421

(22) Filed: Mar. 22, 2004

(65) Prior Publication Data

US 2004/0193562 A1 Sep. 30, 2004

(30) Foreign Application Priority Data

Mar. 28, 2003 (SE) .................................... 0300893

(51) Int. Cl.
*G06F 17/00* (2006.01)
*G06N 5/02* (2006.01)
(52) U.S. Cl. ........................................................ 706/47
(58) Field of Classification Search ................ 706/46, 706/47, 905; 701/11; 434/35
See application file for complete search history.

(56) References Cited

U.S. PATENT DOCUMENTS

| | | | | |
|---|---|---|---|---|
| 4,959,015 | A * | 9/1990 | Rasinski et al. ................. | 434/2 |
| 5,023,791 | A * | 6/1991 | Herzberg et al. ............... | 701/35 |
| 5,260,874 | A * | 11/1993 | Berner et al. .................. | 701/33 |
| 5,406,477 | A * | 4/1995 | Harhen ........................... | 703/6 |
| 5,537,590 | A * | 7/1996 | Amado ........................... | 707/2 |
| 5,549,477 | A * | 8/1996 | Tran et al. ...................... | 434/5 |
| 5,566,295 | A * | 10/1996 | Cypher et al. ................ | 715/763 |
| 5,606,500 | A * | 2/1997 | Tran .............................. | 701/1 |

(Continued)

FOREIGN PATENT DOCUMENTS

WO WO 96/35982 11/1996

(Continued)

OTHER PUBLICATIONS

An approach for integrating statistical decision-support data with fuzzy action rules Nykanen, O.; Advanced Learning Technologies, 2004. Proceedings. IEEE International Conference on Aug. 30-Sep. 1, 2004 pp. 156-160 Digital Object Identifier 10.1109/ICALT.2004. 1357394.*

(Continued)

*Primary Examiner*—Michael B Holmes
(74) *Attorney, Agent, or Firm*—Venable LLP; Michael Sartori; Jeffri A. Kaminski

(57) ABSTRACT

The invention concerns a device with a supervising unit arranged to handle a rule system for the behavior of an entity. The supervising unit comprises at least one storage member in which a set of rules for the behavior is stored. The device also has a user interface comprising a presenter for presenting information, preferably concerning decisions which are made and/or recommended, to a user. The device is arranged with a first and a second rule handler which can work in parallel with each other. The presenter can simultaneously present information concerning the rule handling which is carried out by the first rule handler and the rule handling which is carried out by the second rule handler. The invention also concerns a use, a system comprising a device according to the invention as well as storage media with computer programs for implementing the invention.

29 Claims, 4 Drawing Sheets

U.S. PATENT DOCUMENTS

| | | | |
|---|---|---|---|
| 5,632,622 A | | 5/1997 | Bothwell |
| 5,701,400 A | * | 12/1997 | Amado .................. 706/45 |
| 5,807,109 A | * | 9/1998 | Tzidon et al. ............ 434/35 |
| 5,978,715 A | * | 11/1999 | Briffe et al. ............. 701/11 |
| 6,081,786 A | * | 6/2000 | Barry et al. .............. 705/3 |
| 6,188,988 B1 | * | 2/2001 | Barry et al. .............. 705/3 |
| 6,382,554 B1 | * | 5/2002 | Hagelin ................ 244/3.15 |
| 6,419,185 B1 | * | 7/2002 | Hagelin et al. ......... 244/3.15 |
| 6,572,376 B1 | | 6/2003 | Saunders |
| 6,601,048 B1 | * | 7/2003 | Gavan et al. ............ 706/10 |
| 6,772,055 B2 | * | 8/2004 | Hagelin ................... 701/27 |
| 2002/0065581 A1 | | 5/2002 | Fasca |

FOREIGN PATENT DOCUMENTS

| | | |
|---|---|---|
| WO | WO 01/52008 | 7/2001 |
| WO | WO 01/52221 | 7/2001 |

OTHER PUBLICATIONS

European Patent Office, Feb. 21, 2007, 04 445 035.1—2206, Office Action.

* cited by examiner

DEVICE, USE, SYSTEM, AND STORAGE MEDIUM CONCERNING DECISION SUPPORT FOR, OR THE CONTROL OF, THE BEHAVIOR OF AN ENTITY

BACKGROUND OF THE INVENTION

The present invention relates to a device for generating decision support for decisions which determine the behavior of an entity and/or for controlling the behaviour of an entity. In one embodiment, the device includes a supervising unit arranged to handle a rule system for the behavior, wherein the supervising unit includes at least one storage member in which a set of rules for the behavior is stored, and a user interface including first means for presenting information to a user of the device and second means for inputting instructions to said supervising unit. The device is arranged with a first automatic rule handler which automatically executes said rules according to a predetermined program for the rule handling.

The invention also relates to a use, a system of which the device forms a part and storage media for storing a computer program. The supervising unit may suitably consist of a computer. The first means may, for example, be a viewing screen or other projection device, loudspeakers, or other means. The second means may consist of a keyboard, computer mouse, joystick, microphones etc.

WO 01/52008 A1 and WO 01/52221 A1 describe a device and a system with a rule system concerning the behavior of a real or a simulated vehicle. These documents describe different advantageous manners to construct and to implement the rule handling for such behavior. However, there is a continuing need for further improvements in the art of such rule handling.

SUMMARY OF THE INVENTION

A device according to the present invention provides improved functionality over the known art. One aspect of the invention is to offer such a device which may be applied within many different areas.

Another aspect of the invention is to provide such a device which gives better support for decisions concerning the behavior of an entity and/or a better control of the behavior. Still another aspect of the invention is that a user of the device has the ability to simply influence or specify an alternative behavior for the entity in question or direct the decision support to other parts of the behavior of the entity.

According to an embodiment of the invention, a device is arranged with a second rule handler which enables a user, by instructions via said second means, to indicate an alternative to the automatic execution by the first rule handler, such that the second rule handler is activated and executes the rules in accordance with said instructions from the user at the same time as the first rule handler continues the automatic execution, and wherein the device is arranged such that said first means at the same time is able to present information concerning the rule handling which is carried out by the first rule handler and the rule handling which is carried out by the second rule handler.

Since the device has a second rule handler, a user is not limited to the execution of the rules by the first rule handler. A user may thus indicate an alternative to the execution of the first rule handler. The two rule handlers thereby work in parallel. Information can be presented to the user concerning both the rule handling of the first rule handler and the rule handling of the second rule handler. A user thereby obtains information concerning how the first rule handler handles the rules at the same time as the user obtains information concerning the rule handling of the second rule handler. The user can thereby compare the executions of the two rule handlers. Information concerning the rule handling by the first and second rule handlers can be presented, for example, on a command from a user via said second means. Alternatively, this information can be presented automatically.

It should be noted that said entity may be almost any entity. The expression "behavior" should be interpreted broadly. The behavior may thus be a behavior of, for example, an apparatus or a system which in some manner is influenced by the made decisions. The device may be used for decision support for a person or an operator who makes decisions concerning a certain behavior. The device can however also be used for automatically directly controlling the whole behavior or a part of the behavior of an entity such as an apparatus, a system or a machine.

It should also be noted that by the expressions "execute" and "execution" is here meant that the rule handler goes through the rules in accordance with a predetermined program. The execution therefore does not necessarily mean that the decisions which the rules which are executed indicate are automatically carried out. Instead, these decisions may only be considered as a support for a person or for an operator. The first rule handler thus executes the rules automatically according to a predetermined program. The instructions of the user mean some departure at at least some occasion from this predetermined program. Also the second rule handler preferably executes the rules automatically, but then in accordance with the departure which the user has specified. The first rule handler thus continues the automatic predetermined rule handling while the second rule handler continues with the automatic execution with respect to the alternative or alternatives which the user has determined.

It should also be noted that the invention may also be implemented with more than two rule handlers, for example, in order to give information of the type non-decision.

According to a preferred embodiment, the device is arranged such that the rule system is divided into a plurality of states for different parts of said behavior, wherein each state includes one or more of the rules. Since the rules are divided into different states, the overview over the rules and the rule handling are simplified.

The device may also be arranged such that the rule system is divided into a plurality of rule blocks, each of which includes one or more rules, wherein each state includes one or more rule blocks, wherein the rules within a certain rule block concern a certain aspect of the behavior within the state in question. By further dividing the rule system into rule blocks, the handling and the overview of the rules are further improved and simplified.

According to another embodiment, the device is arranged such that names which identify said states, rule blocks and/or rules, automatically or in response to a command entered via said second means, are presented to a user with the help of said first means. A user can thereby obtain a good overview of the rule system.

It should be noted that the expression "name" shall here be broadly interpreted. The name may suitably constitute a combination of letters in a natural language. This is however not necessary. The name may also constitute some other kind of symbol which symbolizes the state, the rule block or the rule in question. The name may, for example, be shown on a clearly marked surface on a viewing screen. The surface in question may, for example, have the shape of a button.

When a plurality of names which concern different states are presented with the help of said first means, the name of the state in which said first rule handler exists can be marked with a first kind of marking. It is thus made clear in which state the first rule handler exists. With "exists" is here meant that the state in question is in which the entity presently shall be in, in accordance with the rule handling of the first rule handler.

When the second rule handler is activated by instructions from a user, according to one embodiment, the name of the state in which said second rule handler exists is marked with a second kind of marking which differs from the first kind of marking, wherein both the first and the second kind of marking simultaneously can be presented via said first means. A user can thus simultaneously obtain information concerning in which state both the first and the second rule handler exists.

The device can be arranged to via said first means show a decision support window which comprises at least one area which represents a state, wherein this area comprises names which identify at least different rules which form part of the state. A user may thus get a good overview over different rules which form part of the state in question. The name of a rule can, for example, be shown on a surface (a "button") which represents the rule in question. It should be noted that said "area" can be a separate window which, for example, is shown on a computer screen but also a clearly marked area within a larger window.

Said area suitably comprises names of a plurality of rules, wherein the name of the rule or rules which are activated for the moment according to said first and/or second rule handler are provided with markings which indicate that the rule or the rules in question are activated. Hereby a user simultaneously can get information concerning which rule or rules that are presently activated.

It should be noted that when it is said that a rule is activated, this means that the conclusion or the behavior which the rule recommends ought to be carried out in accordance with the recommendation from the rule handler in question. In case the rule handler directly controls the behavior of the entity, this means that the conclusion or the behavior which the rules specifies is automatically carried out.

When the second rule handler is activated by instructions from a user, suitably the name of the rule or rules which are activated according to said first rule handler is marked with a first kind of marking, while the rule or rules which are activated according to said second rule handler are marked with a second kind of marking which differs from the first kind of marking. According to this embodiment, a user may thus clearly see which rule or rules that are activated by the first rule handler simultaneously as the user can see which rule or rules that are activated according to the second rule handler. A user thus gets a very good overview.

Said area can suitably comprise the name of one or more rule blocks which form part of the state. By also including the name of the rule blocks, the possibility of obtaining an overview of the rules is further improved.

According to a preferred embodiment, the device is arranged such that a user with the help of a simple command via said second means can deactivate the second rule handler. This has the advantage that the rule handling thereby no longer is carried out by the second rule handler. The rule handling can thus return to the first rule handler.

According to a preferred embodiment, the device is arranged in a simple manner to enable a user to via said second means name at least different rules, wherein the device is arranged such that the names of the rules which have been named by the user, and which form part of a certain state, are automatically shown within said area, when said area which represents the state in question is shown in said decision support window. A user thereby has the possibility to in a simple manner create the appearance of the decision support which is shown in the decision support window. For example, a user may in a simple manner name the rules in a natural language. In this manner, it is easy for the user to name the rules in a manner which makes it easy to remember what the rules represent. As has been mentioned above, the names may for example be shown on "buttons" which represent the rules. A user may thus, by naming the rules, in a simple manner create different "buttons" which are to be shown in the decision support window.

Preferably, said plurality of states are organized in a network or a hierarchy of states, wherein the device is arranged such that a user in a simple manner can modify the states by naming states and/or adding states and/or removing states and/or changing the position of the states in the network or the hierarchy, wherein the device is arranged such that when said decision support window is shown, a plurality of states are automatically shown, wherein the device is arranged such that these states are automatically shown in accordance with the modifications of the states which the user has carried out. The user may thus personally make changes in the state structure, such that automatically the modified state structure can be presented in said decision support window.

The device is suitably arranged such that the rule system is divided into a plurality of states and/or rule blocks for different parts of said behaviour and such that the user by a command via said second means in advance can define that for a certain state or a plurality of states and/or rule blocks it is the case that the rules which form part of the state and/or the rule block shall not be activated automatically, such that said behaviour of the entity in these states and/or rule blocks always is handled manually. For example, in the case where the rule handler automatically carries out a certain behavior, it can be advantageous for a user in advance to be able to define that the behavior within certain states and/or rule blocks always is to be handled manually. Suitably it can thereby be shown in the decision support window that the rules in a certain rule block or state are handled manually.

According to an advantageous embodiment, the device is arranged such that a rule comprises one or more predetermined and pre-programmed premises which can either be true or false and one or more predetermined and pre-programmed conclusions, wherein the device is arranged such that each premise in the rule is assigned an indicator which can indicate three different conditions, e.g., a first condition which means that the premise shall be true, a second condition which means that the premise shall be false and a third condition which means that it does not matter whether the premise is true or false, wherein at least one conclusion is suited to be carried out if all of said premises fulfil the condition set by the assigned indicators. Each conclusion in the rule is suitably assigned an indicator which can indicate two different cases, a first case which indicates that the conclusion shall be carried out or a second case which indicates that the conclusion shall not be carried out, wherein a conclusion is intended to be carried out if all of said premises in the rule fulfil the conditions set by the assigned indicators and the indicator of the conclusion indicates said first case. Such an organization of the rule system makes the rule system very easy to use, which has been explained in the above cited WO documents.

The device is suitably arranged to, in response to a command from a user, show one or more of said rules with the help of said user interface, wherein the device is arranged such that a user with the help of said second means of the user interface can change the indications of said indicators. The indications can suitably be changed by one or a few depressions of a key or a button. Even a user without programming experience can hereby in a simple manner make changes in the rule system.

According to still another embodiment, the device is arranged such that at least some of said premises and/or conclusions comprise one or more parameters which can be modified, wherein the device is arranged to, in response to a command from a user via said user interface, present a parameter window which shows at least one premise or conclusion and wherein the user with the help of said user interface can modify the parameter or parameters in said premise or conclusion. Since the device is arranged in this manner, modifications in the rules are further simplified.

According to another embodiment, the device is arranged such that the rule system is divided into a plurality of states, wherein each state comprises a plurality of said rules, which are divided in one or more rule blocks which concern different aspects of the state, wherein the rule or rules which form part of a certain rule block on command from a user via said user interface is shown as a rule block window. In the rule block window suitably all premises and conclusions which form part of the different rules which form part of the rule block are shown, wherein for each rule in the rule block said indications which indicate said conditions and cases are shown as indicators for the respective premises and conclusions. Hereby a user can in a simple manner see which premises and conclusions that form part of the rules in a certain rule block.

The invention further includes a storage medium for storing a computer program, wherein the storage medium carries a computer program which is such that when it is implemented in a supervising unit as defined above and this supervising unit is connected to a user interface as defined above, a device according to any of the preceding embodiments is implemented. Such a storage medium thus comprises a computer program which when it is implemented offers the above described advantages.

A further aspect of the invention concerns using the device for generating decision support for decisions which determine the behavior of an entity, wherein said entity is a technical apparatus, a technical process or a technical system. The invention is particularly useful for generating decision support concerning such entities.

Preferably, said technical apparatus, technical process or technical system constitutes a vehicle, for example an unmanned or manned aircraft. When conducting such vehicles, many different decisions have to be made. The invention is particularly advantageous to be used in this application. In case of a manned aircraft, the invention can thus be arranged to constitute decision support for the decisions which the pilot needs to make in order to fly the vehicle and in order to carry out missions.

Suitably, the device is used for, by the execution of said rules, automatically controlling at least a part of the behavior of said entity. The invention is particularly advantageous if it is used for automatically controlling at least a part of the behavior of the entity. For example a certain part of the behavior or the whole behavior may thus be controlled automatically with the help of the device.

The invention further includes a system comprising a device according to any of the above embodiments and said entity, wherein said device by the execution of said rules automatically controls at least a part of the behavior of said entity. With such a system, the advantages which have been described above are achieved.

Suitably, the system is arranged such that when said second rule handler is activated, said entity is controlled by this second rule handler, wherein when the second rule handler is deactivated, the control of the entity returns to the first rule handler. This thus enables that the system is completely or partly controlled automatically by the first rule handler. However, a user has the possibility to via instructions start the second rule handler which thereby takes over the control of the entity in question. When the user deactivates the second rule handler, the control of the entity returns to the first rule handler. The entity can be, for example, a manned or an unmanned aircraft.

The invention also includes a storage medium for storing a computer program, wherein the storage medium carries a computer program which is such that when it is implemented in a supervising unit as defined above and this supervising unit is connected to a user interface as defined above and with an entity according to any of the three last mentioned paragraphs above, a system according to the above is implemented. The storage medium thus comprises a computer program. When this computer program is implemented, a system according to the above with the described advantages is implemented.

BRIEF DESCRIPTION OF THE DRAWINGS

The present invention will now be explained with the help of different embodiments given as examples and with reference to the annexed drawings.

DETAILED DESCRIPTION OF THE PREFERRED EMBODIMENTS

Embodiments of the invention will now be described with reference to the figures. It should be noted that certain aspects of the rule handling are known from the above cited WO documents, which are incorporated herein by reference. However, the present invention is particularly advantageous if it is used together with such a rule handling. In particular, that which is described below with reference to FIGS. 2, 3 and 4 primarily concerns how the rule system is constructed and how this can be modified. This rule editing is to a large extent known per se from the above mentioned WO documents.

It should also be noted that the invention is applicable in many different contexts. As an example of the application is below described the use of the invention in connection with aircrafts.

According to an embodiment which is described below, information is presented to the user in the form of different windows on, for example, a computer screen. It should be noted that the invention is in no way limited to the text which is shown in the figures below. This text shall thus only be seen as an example of the use of the invention.

Figure 1:
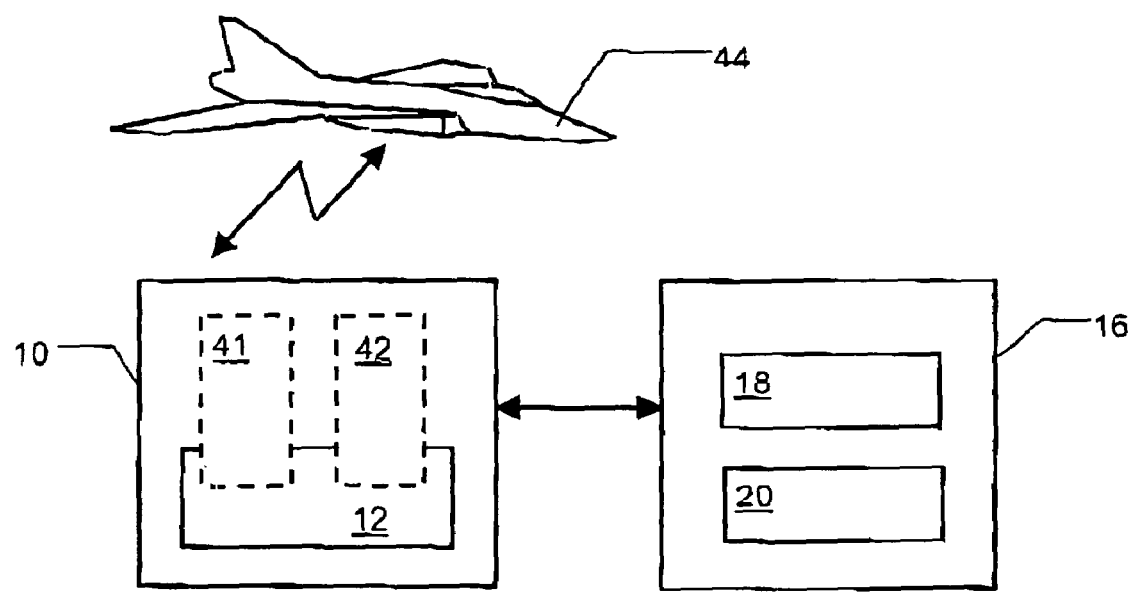
FIG. 1 is a schematic view of a device and a system according to a preferred embodiment of the invention.

FIG. 1 shows schematically a device according to one embodiment of the invention. The device includes a supervising unit 10, which may consist of a computer, i.e., a technical device which can automatically take care of the rule handling in accordance with a program. The supervising unit 10 includes at least one storage member 12 in which a set of rules 14 (see FIG. 3) is stored. These rules 14 are arranged to control the behavior of an entity 44. The entity 44 may for example be some kind of apparatus, process or system. The device is arranged to generate decision support for the decisions which, for example, an operator of the entity 44 has to make. The The device may also be arranged to automatically control the whole behavior of the entity 44 or a part of the behavior of the entity 44. The device also includes a user interface 16 which includes first means 18 for presenting information to a user. These first means 18 may for, example, include a viewing screen, loudspeakers or the like. The user interface 16 also includes second means 20 for inputting instructions to the supervising unit 10. These second means 20 may, for example, constitute a keyboard, a joystick, a computer mouse, a microphone or the like.

Figure 5:
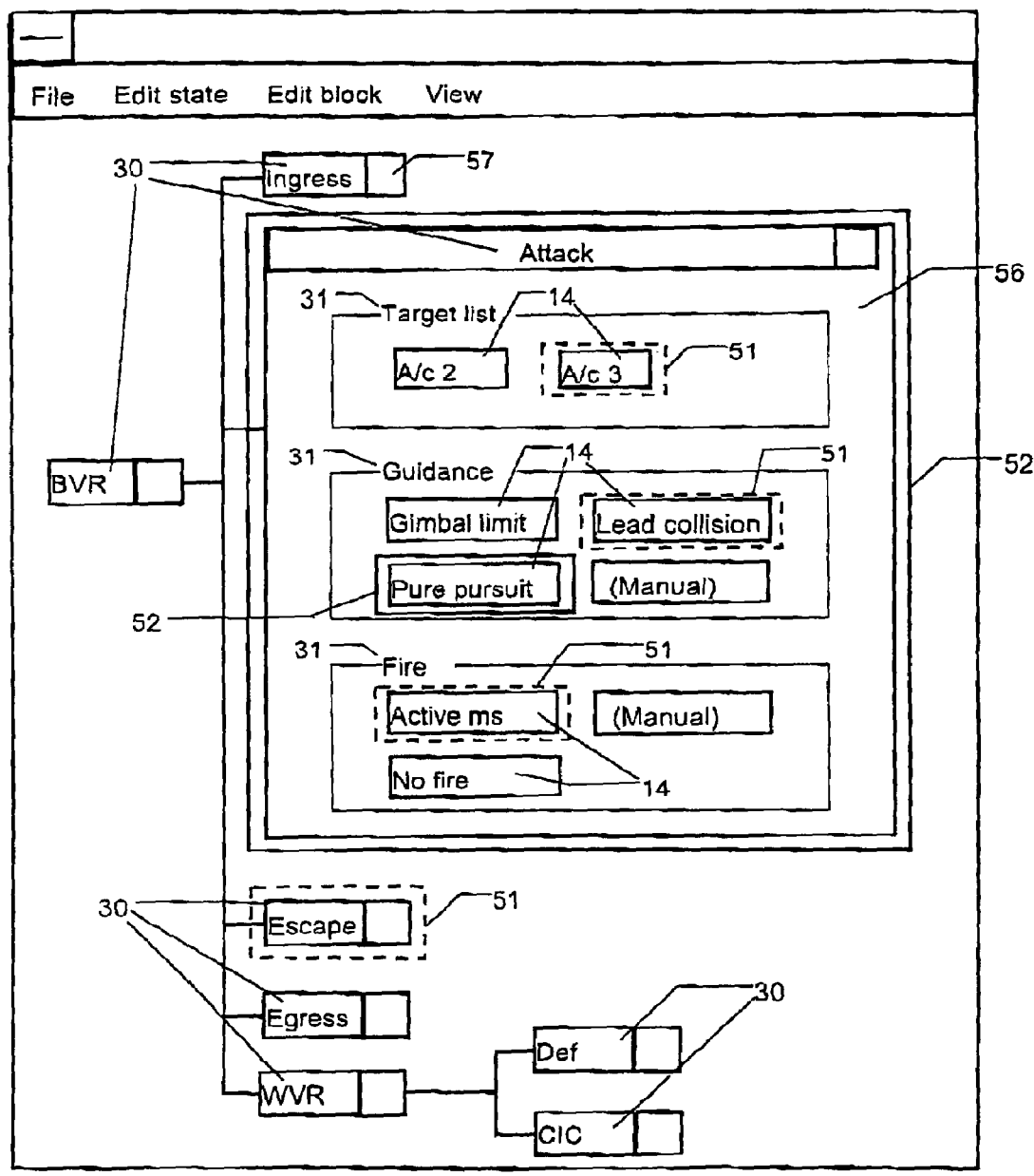
FIG. 5 shows an example of a decision support window which the device according to the invention is arranged to illustrate.

According to the invention, the device is arranged with at least a first rule handler 41 and a second rule handler 42. These rules handlers 41, 42 can for example constitute different aspects of the computer program which controls the rule handling. The first rule handler 41 executes the rules 14 according to a predetermined program for the rule handling. The second rule handler 42 can be activated by a user, for example, in that the user inputs instructions via said second means 20. The second rule handler 42 is thereby activated and executes the rules in accordance with the instructions which have been inputted. At the same time, the first rule handler 41 continues with the execution of the rules. The device is arranged such that said first means 18 at the same time can present information concerning the rule handling which is carried out by the first rule handler 41 and the rule handling which is carried out by the second rule handler 42. This will be exemplified more closely below, in particular in connection with the decision support window which is shown in FIG. 5.

FIG. 1 also shows a system according to a preferred embodiment of the invention. According to this embodiment, an aircraft 44 forms part of this system. The whole device may, for example, be positioned in the aircraft 44 itself. If the aircraft 44 is an unmanned aircraft, the whole device or parts of the device can also be arranged on the ground in order to communicate in a wireless manner with the aircraft 44. Preferably, the device is arranged such that it by executing the rules 14 automatically controls at least a part of the behavior of the aircraft 44. Suitably, the aircraft 44 is normally controlled by the first rule handler 41. When the second rule handler 42 is activated, the aircraft 44 is however controlled by the second rule handler 42. When the second rule handler 42 is deactivated, the control of the aircraft 44 returns to the first rule handler 41.

Figure 2:
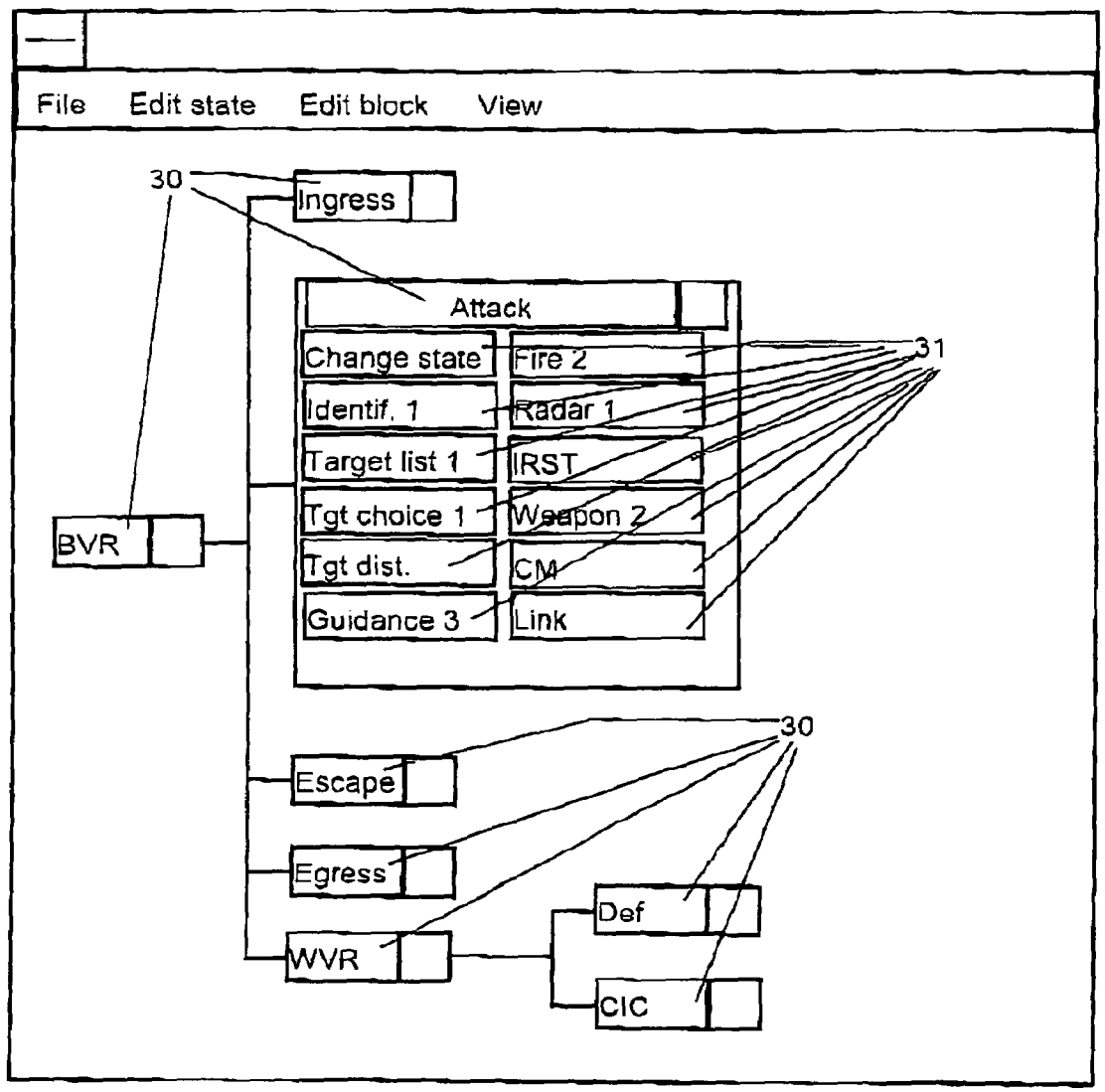
FIG. 2 shows an example of a window with states which the device according to an embodiment of the invention is arranged to illustrate.

In order to simplify for a user to get an overview over the function of the device and in order to in a simple manner being able to select different situations in the behavior of an entity 44, the device is arranged such that the rule system is divided into a plurality of states 30 (see FIG. 2). These states 30 represent different situations in which the entity 44 may be or different phases of the behavior of the entity 44. The states 30 are suitably arranged in a network or in a hierarchy of states 30. FIG. 2 shows such a hierarchy of states 30. A certain state 30 may thus have 0,1 or more substates. FIG. 2 shows for example that the state which is marked with "Ingress" does not have any substate. On the other hand, the state which is marked with "WVR" has two substates. The device is suitably arranged to in response to a command from a user, for example via the keyboard or the computer mouse, show a window (FIG. 2) which illustrates the network or the hierarchy of states 30.

The device is also arranged such that a user may create new states 30 or remove states 30. States 30 may for example be added or removed by first clicking on a menu in the upper part of the window which illustrates said network or hierarchy of states 30. Alternatively, it is possible that new states 30 are created or that states 30 are removed by clicking with the computer mouse directly on the states 30 which are shown in the window. Concerning the hierarchy of states 30, for example, the following grouping is possible according to this embodiment: a highest level where it is indicated which kind of aeroplane is involved, a second level which indicates different kinds of missions which the aeroplane can carry out, a third level which states different phases of the different missions and so on.

The behavior of the entity 44 in a certain state 30 is controlled by a plurality of rules 14. The rules 14 which form part of a state 30 can be divided into a plurality of rule blocks 31. It is thus shown in FIG. 2 that the state 30, which is labelled "Attack", comprises twelve rule blocks 31. Each rule block 31 can concern a certain aspect of the state 30. Each rule block 31 thus comprises the rule or rules 14 which are relevant to the rule block 31 in question.

As can be seen in FIG. 2, the device is arranged such that names which identify states 30 and rule blocks 31 are shown in the window. In response to a command from a user, for example, the state window according to FIG. 2 with names of the states 30 which form part thereof is thus shown.

If an operator gives a suitable command, for example, with the help of the computer mouse, a state 30 (such as the state "Attack" in FIG. 2) is enlarged such that the rule blocks 31 which form part thereof are shown.

Figure 3:
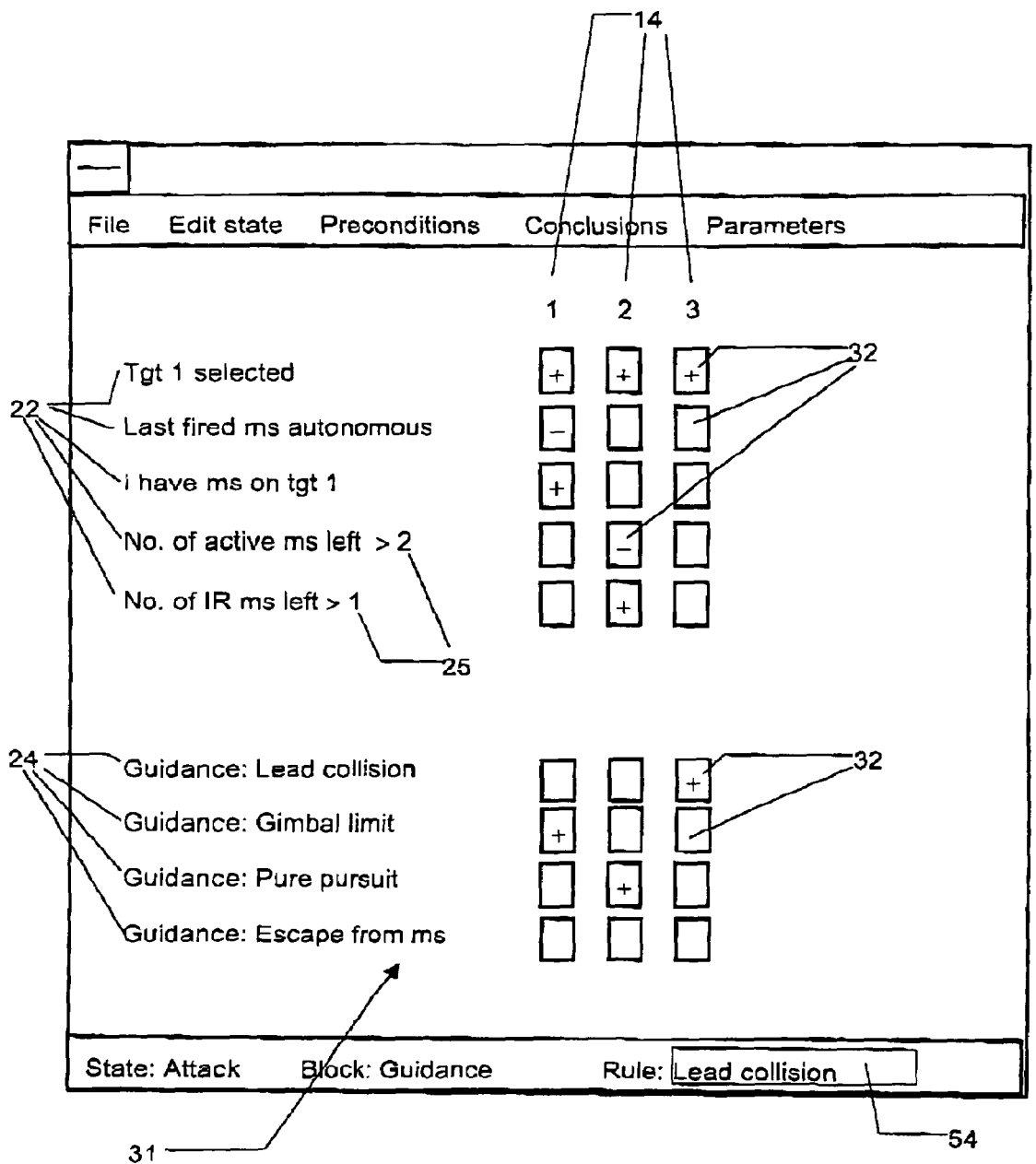
FIG. 3 shows an example of a rule block window which the device according to the invention is arranged to illustrate.

The device is arranged to in response to a command from a user via the user interface 16 show a rule block 31 in more detail with the help of a rule block window (FIG. 3). Each rule 14 comprises one or more predetermined premises 22 which may either be fulfilled or not fulfilled, i.e., they may be true or false. Furthermore, a rule 14 comprises one or more predetermined conclusions 24. The conclusions thus indicate for example some kind of behavior which the entity 44 shall perform. The rule block window in FIG. 3 comprises three rules 14 marked with 1, 2 and 3. Each rule 14 is thus represented by a column in the rule block window. In the rule block window all premises 22 and conclusions 24 which form part of the different rules 14 which are included in the rule block 31 are shown. In a similar manner as concerning the states 30, the device is arranged such that the user can add or remove premises 22 or conclusions 24 to or from the different rules 14.

Each premise 22 in a rule 14 is assigned an indicator 32 which can indicate three different conditions, namely a first condition which means that the premise 22 shall be true, a second condition which means that the premise 22 shall be false and a third condition which means that it does not matter whether the premise 22 is true or false. Furthermore, suitably each conclusion 24 in a rule 14 is assigned an indicator 32 which can indicate two different cases: a first case which indicates that the conclusion 24 shall be executed and a second case which indicates that the conclusion 24 shall not be executed. A conclusion 24 is thus intended to be executed if all premises 22 which form part of the rule 14 fulfil the conditions which they are assigned with the indicators 32 and the indicator 32 of the conclusion 24 indicates that the conclusion 24 shall be executed. The different indications are marked in the columns for the respective rule 14 in the rule block window. FIG. 3 shows examples of such indications 32 for the rules 14. The indication "+" indicates in this case that a premise 22 shall be true or that a conclusion 24 shall be executed indication "–" indicates that a premise 22 shall be false. A white square indicates that it does not matter whether the premise 22 in question is false or true. Concerning rule 2 in FIG. 3 it is thus the case that the conclusion 24 (Pure pursuit) should be executed if the first and fifth premises 22 are true and the fourth premise 22 is false. Said indications 32 may of course have another appearance than those shown. The indications 32 may thus for example constitute a black, white or grey square.

The device is arranged such that the user in a simple manner can change the different indications 32 for the premises 22 and the conclusions 24. For example, these indications 32 can be changed in that the user clicks with the computer mouse.

Figure 4:
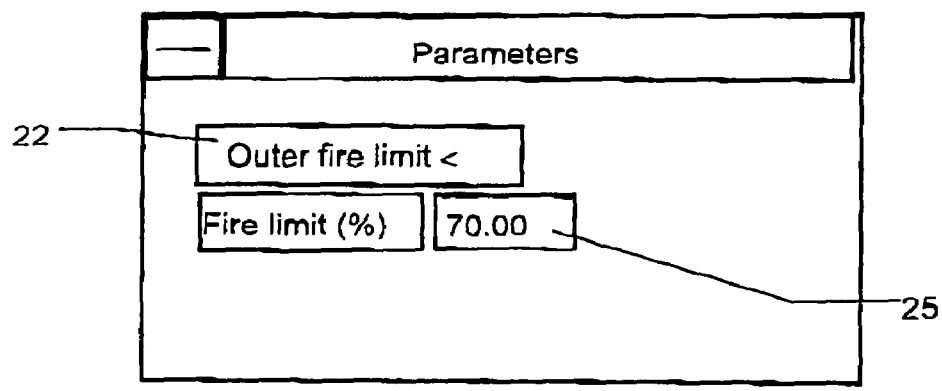
FIG. 4 shows an example of a parameter window which the device according to the invention is arranged to illustrate.

The device is also arranged such that a user can change the possible parameters 25 which form part of the premises 22 or the conclusions 24. This may for example be done by clicking on a menu in the upper part of the rule block window or by clicking in a certain manner (or with a certain computer mouse button), on the premise or conclusion in question. Thereby a parameter window (see FIG. 4) may be shown. This parameter window shows a premise 22 or a conclusion 24. In FIG. 4 a premise 22 is shown. The parameter 25 or parameters 25 may thereby be changed by a user. The device is also arranged such that a user in a simple manner may add or remove rules 14 and add or remove premises 22 or conclusions 24 which form part of the different rule blocks 31. An advantage with the device is that the premises 22 and conclusions 24 are written in a natural language and are thus easy to understand for a user without any particular knowledge of programming.

The device may also be arranged to in response to a command from a user show a window which includes all the premises 22 or conclusions 24 which are available for the rules 14 for a certain state 30 or a certain rule block 31. An example of such a window is given in the above cited WO-publications.

It should be noted that it may vary from state 30 to state 30 which rule blocks 31 which form part thereof. However, preferably all states 30 comprise a kind of rule block 31 which describes the rules 14 for when a transition to another state 30 takes place.

When the device is run for generating decision support and/or for controlling the behaviour of an entity, the different rules 14 in a rule block 31 is suitably dealt with in order. This is, for example, thereby done by starting with the first premise 22 in the first rule 1 whereafter the other premises 22 and conclusions 24 in the first rule 1 follow. Thereafter, the same order follows for the second rule 2, etc. The different rule blocks 31 which form part of a state 30 may suitably be gone though in order. The device also includes means with which a user can set with which frequency the different rules 14 shall be gone through. Suitably, the device is arranged such that the rule block 31 is left as soon as a conclusion 24, or possibly several conclusions 24 in a rule 14 in the rule block 31 has been executed, or as soon as the execution of the rule system leads to the fact that some other rule 14 (or other state 30) gets a higher priority.

The device according to the present invention is suitably arranged in order to enable for a user, via said second means 20, to name different states 30, rule blocks 31 or rules 14. This may, for example, be done in the following manner. In for example the rule block window which is shown in FIG. 3 a user may for example with the help of the computer mouse click on a certain rule 14. Thereby the rule 14 in question is identified. This can also be shown in that the rule 14 gets a certain marking. Below to the right in FIG. 3 a square 54 is shown with name of the rule 14. The user may thus here type in a suitable name of the rule 14. For example, the rule 14 may be named in accordance with the conclusion 24 which is meant to be executed according to the rule 14 if all conditions in the premises 22 are fulfilled. In a similar manner, the device may suitably be arranged such that a user in a simple manner may name rule blocks 31 and states 30.

The device according to one aspect of the invention is arranged to show a decision support window (see FIG. 5). In this window, information is shown which can constitute a support for a user of the device. The device is arranged such that the structure of the rule system or names on rules which have been defined by a user automatically decide which information is to be shown in the decision support window. This decision support window is thus automatically generated by a user, for example in that the user in advance carries out changes in the rule system in the manner which has been described in connection with FIG. 2-4.

In the decision support window a number of states 30 are shown in a similar manner to that which has been described in connection with FIG. 2. In the decision support window also different kinds of markings are shown. A first kind of marking 51 here consists of a broken frame. The marking 51 may also consist of any other marking, for example of a red frame. The first marking 51 (in this case at "Escape") marks the name of the state in which the first rule handler 41 is. FIG. 5 also shows a second kind of marking 52. This marking 52 consists in this case of a continuous line around the name of a state (in this case "Attack"). The second marking 52 marks the state 30 or the name of the state 30 in which the second rule handler 42 is. Both kinds of markings 51, 52 may thus be shown simultaneously in the window according to FIG. 5. A user of the device may for example activate the second rule handler 42 by clicking on a certain state 30. Thereby this state 30 is marked with the second marking 52. Simultaneously, the state 30 in which the first rule handler 41 is, is marked with the first marking 51. The user may deactivate the second rule handler 42 for example by clicking again on the state 30 in question. The second marking 52 thereby disappears.

The device is also arranged to on command from a user in this window show an area 56 which represents a state 30. The command may for example be that the user clicks on the square 57 which is located to the right of the names of the states. In this case, the area 56 thus represents the state 30 "Attack". Within this area 56, names are shown of some or all rules 14 which form part of the state 30. Furthermore, suitably also the name of the rule blocks 31 which form part of the state 30 is shown. The rule blocks 31 are suitably illustrated by a square. Within this square, suitably the names of the different rules 14 which form part of the rule block 31 in question are shown.

The device is arranged such that when a user for example names a rule 14, as has been described above in connection with FIG. 3, the name (or "the button") which represents this rule 14 is automatically generated in the decision support. This means that when the device is used for decision support, in that the decision support window is shown, the names ("buttons") for the rule or rules 14 which have been named will automatically be shown within said area 56, when said area 56 which represents the state 30 in question is shown in the decision support window.

As has been described above in connection with FIG. 2, a user also has the possibility of modifying the states 30 by adding states 30 or by removing states 30. The user also has the possibility of naming states 30 and to change the position of the states 30 in the network or hierarchy of states 30. The device is arranged such that when a user modifies the states 30 in this manner, the decision support will automatically be modified in the corresponding manner. This means that when the decision support window is shown, the states 30 are automatically shown, in accordance with the modifications of the states 30 that the user has carried out. The decision support window thus shows the state structure in accordance with the modifications of the user.

In the decision support window, the names ("buttons") of the rules 14 which are activated or recommended for the moment according to the first rule handler 41 are suitably provided with a first kind of marking 51. The names of the rules 14 which are activated according to the second rule handler 42 are suitably marked with a second kind of marking 52.

In a corresponding manner to that which has been described above in connection with the states 30, a user may thus for example by clicking with the computer mouse on a certain rule 14 give instructions to the second rule handler 42 concerning this rule 14. The device can for example be arranged such that when the user clicks on the rule 14 in question, and if the device is arranged to automatically control the behavior of the entity 44, the conclusion 24 which is stated in the rule 14 is carried out independently of whether the conditions in the premises 22 in the rule 14 are fulfilled. Alternatively, the device can be arranged such that when the user clicks on the rule 14 in question, and if the device is arranged to automatically control the behavior of the entity 44, the conclusion 24 which is stated in the rule 14 is carried out if and only if the conditions in the premises 22 in the rule 14 fulfilled.

The rule or rules 14 which are activated by the second rule handler 42 are marked with a second kind of marking 52. Simultaneously, the rule or rules 14 which actually should be carried out in accordance with the recommendations of the first rule handler 41 are shown with markings 51.

It can also be noted that it is not necessary that a user marks certain particular rules 14. Since a user, according to this example, has activated the second rule handler 42 by clicking on the state 30 "Attack", the rule or rules 14 which are activated by the second rule handler 42 are shown within the area 56 with markings 52. It should also be noted that according to this example, the first rule handler 41 in fact recommends the state 30 "Escape" such as has been described above. Still a number of rules 14 are marked with the marking 51 also within the state "Attack". These rules 14 which are marked with 51 are the rules which the first rule handler 41 recommends within the state "Attack" even if the first rule handler 41 primarily recommends another state 30, i.e. in this case "Escape". A user thus obtains recommendations also concerning which rules 14 that should be activated within the state "Attack" even if the first rule handler 41 in fact recommends another state 30.

If a user clicks on a rule 14 which is marked with the marking 52 (i.e. which is activated by the second rule handler 42), this rule is deactivated. Instead, the behavior of the entity 44 within the rule block 31 in question is controlled by the rule 14 (if any) which is marked with the first marking 51, i.e. which is recommended by the first rule handler 41. By clicking on the rule 14 which is marked with the marking 52, the "forced" carrying out of the rule 14 thus ends.

As has been mentioned above, the user can activate the second rule handler 42 simply by clicking on the state 30 which is marked with the second marking 52.

Since the device is arranged to show a decision support window according to FIG. 5, a user gets a very good overview over the rule handling. At the same time, the user obtains support for which state 30 and which rules 14 that are recommended according to the first rule handler 41 at the same time as the user can override these rules by activating states 30 and/or rules 14 in order to thereby make the second rule handler 42 control the behavior of the entity 44.

It should also be noted that the decision support window according to FIG. 5 only is an example of how the information can be presented. The different recommended states 30 and/or rules 14 can also be presented in another manner that is easy for a user to understand.

From the above described is clear that if the device is arranged to automatically control the behavior or at least a part of the behavior of the entity 44 in question, the control suitably goes over to the second rule handler 42 as soon as this rule handler has been activated by the user. The user can suitably deactivate the second rule handler 42 by clicking again on a state 30 which is activated by the second rule handler 42. Of course the deactivation can also take place in other manners. When the second rule handler 42 is deactivated, the control suitably goes back to the first rule handler 41.

The device can suitably be arranged such that a user in advance can define that for a certain state or certain states 30 or rule blocks 31 it is the case that the rules 14 which form part of the state 30 or the rule block 31 shall not be automatically activated, but that the behavior of the entity 44 in these states 30 or rule blocks 31 always is handled manually. This can be visualized in that the term "Manual" is shown or marked within the state 30 or the rule block 31 in question.

The rule handling may also go over to "Manual" in other manners. For example, if the user manually takes over the control of a certain behaviour, the device may automatically go over to the condition "Manual" in the state 30 or the rule block 31 in question. For example, if the control of the aircraft 44 is done automatically, but the user (the pilot) grabs the control stick and manually controls the aircraft, the device can, concerning the control in the state 30 in question, go over to "Manual".

It can also be noted that it is possible that the same state 30 or the same rule 14 are marked with both the first kind of marking 51 and the second kind of marking 52. This can thus happen if for example the state 30 which has been selected by the user (i.e. in which the second rule handler 42 is) happens to coincide with the state 30 in which the first rule handler 41 is or exists.

The invention also concerns a use of the device. According to this use, the device is used for generating decision support for decisions which determine the behavior of an entity 44, wherein said entity 44 is a technical apparatus, a technical process or a technical system. Suitably, the entity 44 can constitute a vehicle, for example an unmanned or a manned aircraft. According to an advantageous use, the device is used, by execution of the rules 14, for automatically controlling at least a part of the behavior of the entity 44.

The invention also concerns a system which includes a device of the kind which has been described above in combination with an entity 44. The system is arranged such that the device by the execution of the rules 14 automatically controls at least a part of the behaviour of the entity 44. In the same manner which has been described above, the entity 44 within the system is controlled by the second rule handler 42 when this is activated. When the second rule activator 42 is deactivated, the control of the entity 44 returns to the first rule handler 41. The entity 44 can such as has been exemplified above for example be a manned or an unmanned aircraft.

The invention also concerns a storage medium which comprises a computer program. When this program is implemented in a suitable device or in a suitable system, a device or a system according to what has been described above is obtained.

The invention can be applied in many different contexts where different decisions shall be made. The invention can be applied for only generating decision support for decisions which are made by a user. Alternatively, the invention can be used for completely or partly automatically controlling and entity 44. For example, the invention can be applied within the following fields: decision support for drivers of a vehicle; control of a vehicle under supervision of a driver; decision support/control of an unmanned vehicle; decision support for NCW (Net Centric Warfare); for TES (Tactical Environment Simulator) etc.

The present invention is not limited to the described embodiments. The invention may thus be modified and varied within the scope of the following claims.

The invention claimed is:

1. A device for generating decision support for decisions which determine and/or control the behavior of an apparatus, a tangible system, or a machine comprising:
a supervising unit arranged to handle a rule system for the behavior, wherein the supervising unit comprises at least one storage member in which a set of rules for the behavior is stored,
a user interface including first means for presenting information to a user of the device and second means for inputting instructions to said supervising unit,
the device being operable with a first automatic rule handler automatically executing said rules to control the behavior of the apparatus, the tangible system, or the machine according to a predetermined program for the rule handling, wherein each rule to control the behavior of the apparatus, the tangible system, or the machine includes at least one configurable premise having a plurality of states and at least one configurable conclusion that specifies a behavior to be performed when the at least one configurable premise is in a particular state,
the device being operable with a second rule handler which enables a user, by instructions via said second means, to control the behavior of the apparatus, the tangible system, or the machine as an alternative to a behavior of the apparatus, the tangible system, or the machine that is to be carried out according to a rule in the set of rules that are automatically executed by the first rule handler, such that the second rule handler is activated and executes the rule in the set of rules with the alternative to the behavior in accordance with said instructions from the user at the same time that the first rule handler continues the automatic execution of the other rules in the set of rules to control other behavior of the apparatus, the tangible system, or the machine, the device being further operable such that said first means at the same time is able to present information concerning the rule handling which is carried out by the first rule handler and the rule handling which is carried out by the second rule handler.

2. A device according to claim 1, wherein the rule system is divided into a plurality of states for different parts of said behavior, and wherein each state includes at least one of said rules.

3. A device according to claim 2, wherein the rule system is divided into a plurality of rule blocks, each of which includes at least one rule, wherein each state includes at least one rule block, wherein the rules within a certain rule block relate to a certain aspect of the behavior within the corresponding state.

4. A device according to claim 2, wherein names which identify said states, rule blocks and/or rules, automatically or in response to a command entered via said second means, are presented to a user with said first means.

5. A device according to claim 4, further comprising means, associated with said first means, for presenting a plurality of names which concern different states, wherein the name of the state in which said first rule handler exists, is marked with a first kind of marking.

6. A device according to claim 5, wherein when the second rule handler is activated by instructions from a user, the name of the state in which said second rule handler exists, is marked with a second, different kind of marking, wherein both the first and second marking markings are capable of being simultaneously presented by said first means.

7. A device according to claim 2, wherein said first means provides a decision support window which includes at least one area which represents a state, wherein the area includes names which identify at least one distinct rule that forms a part of the state.

8. A device according to claim 7, wherein said area includes at least names of a plurality of rules, wherein the name of the rule or rules which are activated for the moment according to at least one of said first and second rule handler are provided with markings which indicate that the rule or the rules in question are activated.

9. A device according to claim 8, wherein when the second rule handler is activated by instructions from a user, the name of the rule or rules which are activated according to said first rule handler is marked with a first kind of marking, while the rule or rules which are activated according to said second rule handler are marked with a second, different kind of marking.

10. A device according to any claim 7, wherein said area also includes the name of at least one rule block which forms part of the state.

11. A device according to claim 1, further comprising means, operable in response to a command via said second means, for deactivating the second rule handler.

12. A device according to claim 7, wherein said second means includes means for naming at least one distinct rule, the names of the rules which have been named by the user, and which form part of a certain state, being automatically shown within said area, when said area which represents the state in question is shown in said decision support window.

13. A device according to claim 7, wherein said plurality of states (30) are organized in at least one of a network and a hierarchy of states, wherein the device further includes means for allowing a user to modify the states by performing at least one of the activities which include naming states, adding states, removing states, and changing the position of the states in the network or hierarchy, wherein when said decision support window is shown, a plurality of states are automatically shown, and wherein the states are automatically shown in accordance with the modifications of the states which the user has carried out.

14. A device according to claim 1, wherein the rule system is divided into at least one of a plurality of states and rule blocks for different parts of said behavior, the device further includes means, operable in response to an advance user command via said second means for defining that, for a certain state or a plurality of states and/or rule blocks, the rules which form part of the state and/or the rule block shall not be activated automatically, whereby the behavior of the apparatus, tangible system, or machine in these states and/or rule blocks is always handled manually.

15. A device according to claim 1, wherein at least one of the rules includes at least one predetermined and preprogrammed premise which can either be true or false and at least one predetermined and preprogrammed conclusion, wherein each premise in the rule is assigned an indicator which can indicate three different conditions, including a first condition that the premise shall be true, a second condition that the premise shall be false and a third condition that it does not matter whether the premise is true or false, wherein at least one conclusion is carried out if all of said premises fulfill the conditions set by the assigned indicators.

16. A device according to claim 15, wherein each conclusion in the rule is assigned an indicator which can indicate two different cases, a first case which indicates that the conclusion shall be carried out and a second case which indicates that the conclusion shall not be carried out, wherein a conclusion is carried out if all of said premises in the rule fulfill the conditions set by the assigned indicators and the indicator of the conclusion indicates said first case.

17. A device according to claim 15, including means, operable on command from a user, for showing at least one of said rules with said user interface, and further comprising means, operable by a user with the help of said second means of the user interface, for changing the indications of said indicators.

18. A device according to claim 17, further comprising means for changing said indications, the changing means requiring user operation of at least one depressions of at least one of a key and a button.

19. A device according to claim 15, wherein at least some of said premises and conclusions comprise at least one parameter which can be modified, wherein in response to a command from a user via said user interface the device presents a parameter window which shows at least one premise or conclusions and wherein the user using said user interface can modify the parameter or the parameters in said premises or conclusion.

20. A device according to claim 1, wherein the rule system is divided into a plurality of states, wherein each state comprises a plurality of said rules, which are divided into at least one rule block which concern different aspects of the state, wherein the rule or rules which form part of a certain rule block on command from a user via said user interface is shown as a rule block window.

21. A device according to claim 20, wherein in said rule block window are all premises and conclusions which form part of the different rules which form part of the rule block, wherein for each rule in the rule block indications which indicate said conditions and cases are shown as indicators for the respective premises and conclusions.

22. A storage medium for storing a computer program, wherein the storage medium carries a computer program which is such that when it is implemented in a supervising unit connected to a user interface, the computer program provides a first automatic rule handler automatically executing rules to control the behavior of an apparatus a tangible system, or a machine according to a predetermined program for the rule handling, wherein each rule to control the behavior of the apparatus, the tangible system, or the machine includes at least one configurable premise having a plurality of states and at least one configurable conclusion that specifies a behavior to be performed when the at least one configurable premise is in a particular state, and a second rule handler which enables a user, by instructions via a second means, to control the behavior of the apparatus, the tangible system, or the machine as an alternative to a behavior of the apparatus, the tangible system, or the machine that is to be carried out according to a rule in the set of rules that are automatically executed by the first rule handler such that the second rule handler is activated and executes the rule in the set of rules with the alternative to the behavior of the apparatus, tangible system, or machine in accordance with said instructions from the user at the same time that the first rule handler continues the automatic execution of the other rules in the set of rules to control other behavior of the apparatus, tangible system, or machine, wherein a first means at the same time is able to present information concerning the rule handling which is carried out by the first rule handler and the rule handling which is carried out by the second rule handler.

23. A device according to claim 1, wherein said device includes means, by the execution of said rules, for automatically controlling at least a part of the behavior of said apparatus, tangible system, or machine.

24. A system comprising:

an apparatus, a tangible system, or a machine, a device for controlling the behavior of the apparatus, tangible system, or machine, the device including a first automatic rule handler automatically executing rules to control the behavior of the apparatus, the tangible system, or the machine according to a predetermined program for the rule handling, wherein each rule to control the behavior of the apparatus, the tangible system, or the machine includes at least one configurable premise having a plurality of states and at least one configurable conclusion that specifies a behavior to be performed when the at least one configurable premise is in a particular state;

a second rule handler which enables a user, by instructions via a second means, to control the behavior of the apparatus, the tangible system, or the machine as an alternative to a behavior of the apparatus, the tangible system, or the machine that the second rule handler is activated and executes the rule in the set of rules with the alternative to the behavior in accordance with said instructions from the user at the same time that the first rule handler continues the automatic execution of the other rules in the set of rules to control other behavior of the apparatus, the tangible system, or the machine, a first means at the same time is able to present information concerning the rule handling which is carried out by the first rule handler and the rule handling which is carried out by the second rule handler.

25. A system according to claim 24, wherein when said second rule handler is activated, said apparatus, tangible system, or machine is controlled by this second rule handler, wherein when the second rule handler is deactivated, the control of the apparatus, tangible system, or machine returns to the first rule handler.

26. A system according to claim 24, wherein said apparatus, tangible system, or machine is a manned or unmanned aircraft.

27. A system according to claim 26, further comprising a storage medium for storing a computer program, wherein the storage medium carries a computer program which is such that when it is implemented in the supervising unit and the supervising unit is connected to a the user interface the behavior of the apparatus, tangible system, or machine is controlled.

28. A vehicle comprising a device according to claim 1.

29. An unmanned or manned aircraft comprising a device according to claim 1.

* * * * *